US012777209B2

(12) United States Patent
Sharafyan et al.

(10) Patent No.: US 12,777,209 B2
(45) Date of Patent: Oct. 27, 2026

(54) REPRODUCTION AT ADAPTIVE SPEED FOR REAL-TIME MEDIA STREAMING

(71) Applicant: SAIMA, INC., Berkeley, CA (US)

(72) Inventors: Mnatsakan Sharafyan, Yerevan (AM); Narek Hovsepyan, Yerevan (AM); Gor Matevosyan, Yerevan (AM)

(73) Assignee: SAIMA, INC., Woodland Hills, CA (US)

( * ) Notice: Subject to any disclaimer, the term of this patent is extended or adjusted under 35 U.S.C. 154(b) by 0 days.

(21) Appl. No.: 19/322,739

(22) Filed: Sep. 9, 2025

(65) Prior Publication Data

US 2026/0075269 A1 Mar. 12, 2026

Related U.S. Application Data

(60) Provisional application No. 63/693,243, filed on Sep. 11, 2024.

(51) Int. Cl.
*H04N 21/2387* (2011.01)

(52) U.S. Cl.
CPC ................................ *H04N 21/2387* (2013.01)

(58) Field of Classification Search
None
See application file for complete search history.

(56) References Cited

U.S. PATENT DOCUMENTS

2012/0062732 A1 3/2012 Marman
2017/0064244 A1 3/2017 Abou Mahmoud
2019/0079918 A1 3/2019 Thörn
2020/0043511 A1 2/2020 Raikar
2020/0301965 A1 9/2020 Cormican
2022/0286721 A1 9/2022 Tielemans et al.
2023/0412662 A1 * 12/2023 Pan ......................... H04L 47/30
2024/0185888 A1 * 6/2024 Sharafyan ............... G10L 15/08

OTHER PUBLICATIONS

"PCT International Search Report" by the US Patent and Trademark Office (US) in application No. PCT/US25/45549, dated Nov. 4, 2025, 2 pages.
International Claims examined by the US Patent and Trademark Office (US) in application No. PCT/US25/45549, filed on Sep. 9, 2025, 3 pages.

* cited by examiner

*Primary Examiner* — Rong Le
(74) *Attorney, Agent, or Firm* — Arluys IP, P.C.

(57) ABSTRACT

Techniques are described for adapting the playback speed of a real-time media stream to the user's audio comprehension level while maintaining the real-time reproduction of the media stream. In an implementation while receiving a media stream for playback at an original playback speed in real-time, optimal playback speed(s) are determined for a received media segment to maximize the comprehension by a recipient user. Because such optimal playback speeds may slowdown the playback and add to the latency, the projected delay for the received segment is determined. The projected delay is compared to real-time latency thresholds to determine whether predictions are to be made for yet-to-be-received media segments for performing the playback of the received segment at the optimal playback speed(s) without compromising the real-time aspect of the media stream.

24 Claims, 6 Drawing Sheets

REPRODUCTION AT ADAPTIVE SPEED FOR REAL-TIME MEDIA STREAMING

BENEFIT CLAIM

This application claims the benefit under 35 U.S.C. § 119(e) of provisional application 63/693,243, filed Sep. 11, 2024, the entire contents of which are hereby incorporated by reference for all purposes as if fully set forth herein.

This application is related to U.S. Pat. No. 12,198,726, entitled "Content-Based Adaptive Speed Playback," referred to herein as "Adaptive Speed Playback Patent," filed on Feb. 15, 2024, the entire contents of which are hereby incorporated by reference.

This application is also related to U.S. Pat. No. 11,929, 096, entitled "Content-Based Adaptive Speed Playback," filed Mar. 30, 2023, the entire contents of which are incorporated by reference as if fully set forth herein.

FIELD OF THE TECHNOLOGY

The present invention relates to the field of audio processing, in particular to reproduction at adaptive speed for real-time media streaming.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In real-time communication, the speed at which the speech is delivered (referred to herein as "media reproduction speed") often exceeds the comprehension ability of the user consuming the media. This challenge is particularly pronounced in scenarios in which non-native speakers attempt to comprehend fast-paced native speakers, or when the listener is a person with cognitive issues, such as elderly individuals with cognitive decline. Such participants generally struggle to grasp the entire content of fast-paced speech conversations in any medium of communication. These and other scenarios highlight a broader issue that media reproduction speed is not tailored to diverse users'needs, leading to gaps in understanding and reduced communication effectiveness.

In real-time communication, the mismatch between speech delivery speed and comprehension is almost redressable. One approach is for the user facing comprehension challenges to keep requesting repetitions, such as asking the speaker to repeat. However, this approach is disruptive to the flow of conversation and may be frustrating for all participants.

An alternative approach would be to generate real-time transcriptions. However, the generation of the real-time transcription adds significant latency, especially when done on client-side computing systems. Moreover, the transcription forces the participant to multitask, read and listen at the same time, which further deteriorates the already weak comprehension. At the same time, reading captions that are out of sync with the spoken information even more complicates comprehension. Thus, rather than improving comprehension, the real-time transcription may even have the opposite effect, making it difficult to follow the conversation both substantively and contextually.

Yet another alternative approach is to slow down the reproduction of the received incoming audio data of real-time communication. The slowed-down audio improves comprehension but introduces a significant latency/delay in the communication. When such a latency is over 500 ms, the real-time communication is considered disrupted, and the communication is no longer truly real-time.

Accordingly, each of the above approaches to increasing comprehension in real-time communication, while partially effective, fails to bridge the gap between speech speed and user comprehension seamlessly. These approaches fail to guarantee the minimal delay necessary for smooth, real-time interaction.

BRIEF DESCRIPTION OF THE DRAWINGS

In the drawings of certain embodiments in which like reference numerals refer to corresponding parts throughout the figures.

DETAILED DESCRIPTION

Figure 1:
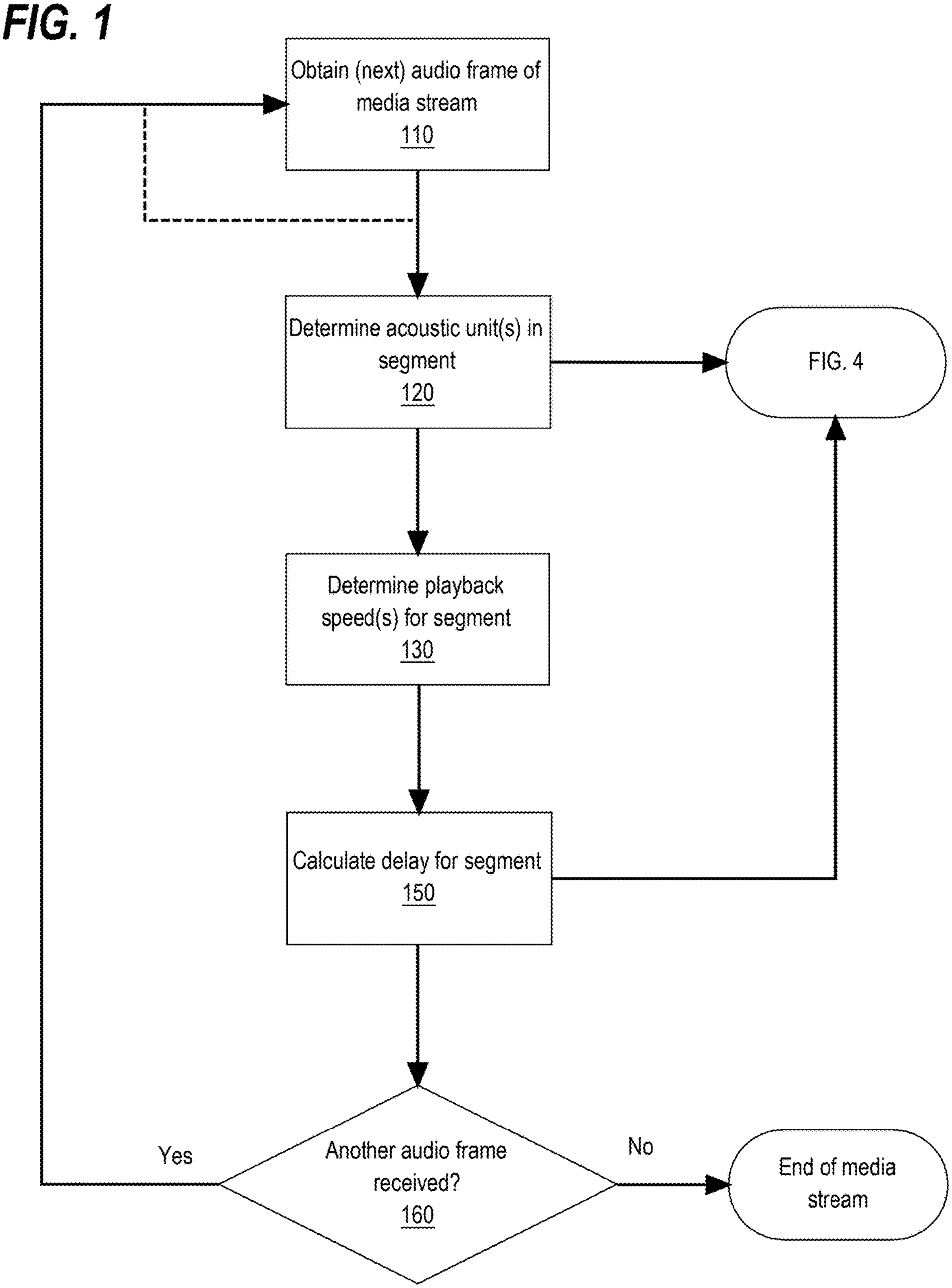
FIG. 1 is a block diagram depicting a process for determining optimal playback speeds for a media stream and the associated projected delays, in one or more implementations.

In the following description, for the purposes of explanation, numerous specific details are set forth in order to provide a thorough understanding of the present invention. It will be apparent, however, that the present invention may be practiced without these specific details. In other instances, structures and devices are shown in block diagram form in order to avoid unnecessarily obscuring the present invention.

General Overview

The approaches herein describe adapting the playback speed of a real-time media stream to the user's audio comprehension level while maintaining the real-time reproduction of the media stream. The term media stream (including audio and/or video media) refers herein to a collection of video and/or audio portions of which one or more portions are yet to be received by the recipient system reproducing the media stream. The real-time aspect in a media stream is maintained when the latency between capturing an audio and/or video portion by the originating system and playing back the portion on the recipient system does not exceed the real-time latency threshold (e.g., less than 500 ms). The real-time aspect of the media stream is lost when the reproduction on the recipient system is one or two words behind. Such a latency in reproduction is considered disruptive for real-time communication because the recipient user may communicate significant information without fully comprehending the earlier-in-time but late-in-reproduction incoming communication.

The techniques described herein change the reproduction speed of the media to improve the cognitive apprehension by the recipient user without compromising the real-time aspect of the media communication. The cognitive apprehension by the user depends on the changes in the rate of speech, long pauses, interjections, and other speech-density parameters. To determine such parameters, the received portions of the media stream have to be analyzed to match the recipient user's comprehension. However, such analysis may even further increase the latency due to the delay in additional processing.

To compensate for this and latencies incurred due to slowdown for comprehension, the techniques described herein dynamically alter the speed of reproduction (i.e., playback speed) of particular portions of the media stream, speeding up the portions with low content density while slowing down the reproduction of other portions with high content density. While the slowdown in the speed improves comprehension by a recipient user, the speedup helps to keep the reproduction real-time to compensate for the slowdowns. Thus, the techniques described herein optimize the speed of the speech by applying optimized speeds to received media portions, while maintaining the real-time reproduction of the speech due to speed-ups in the low-content media portions.

In an implementation, the system maintains threshold(s) to ensure the real-time aspect of the playback of the media stream. The system may calculate the projected delay amount due to the slowdown in reproducing the media portion at an optimal speed for comprehension. The projected delay amount is used in comparison with the threshold(s) to maintain a cap on the latency, and thereby, ensure the real-time reproduction of the media stream.

The system may maintain a soft threshold for real-time latency, reaching which the system has to make a determination/prediction on the content density of the yet-to-be-received portion(s). The term "soft threshold" refers herein to a threshold of latency in reproduction, which, when exceeded, indicates that if no speedup in subsequent portion(s) is performed, the reproduction of the subsequent portion(s) will fail to be in real-time. The system may determine the current content density of the received media chunk(s), and based on the current content density, may determine the content density of yet-to-be-received media portion(s).

Accordingly, if such a determination of the content density indicates future low content density, the system may continue the reproduction of the received portion at the optimal determined speed(s) to match the recipient's comprehension. Otherwise, the system prevents any further slowdowns and performs reproduction at least at the original speed to prevent increasing latency any further.

Additionally or alternatively, the system may maintain a hard threshold for real-time latency, reaching which the system may no longer perform any slowdown of the playback of the received portion, even if such a slowdown is necessary to match the recipient's comprehension. The hard threshold for latency may be the maximum latency allowed for real-time reproduction (e.g., 500 milliseconds). Having such soft and/or hard thresholds ensures that the system reproduces the media stream in real-time while maximizing the comprehension by the recipient.

For example, for a real-time conference call, the recipient system may store the comprehension level for the recipient user. When the media is streamed from the originating system, the recipient system determines the speech density of the received portion(s). The term "speech density" (colloquially referred to as "speech rate") refers herein to a rate of lexical units/phonemes (of acoustic units) in an audio stream or a portion thereof. The recipient system may determine optimal speed(s) for the received portion, thereby determining the projected delay amount to be accumulated if the portion is played back at the optimal speed. Based on the determined projected delay amount, the system may perform a playback of the received conference media portion either at the original or higher speeds or at the optimal speeds to improve the recipient's comprehension.

Acoustic Units

FIG. 1 is a block diagram depicting a process for determining optimal playback speeds for a media stream and the associated projected delays, in one or more implementations. The optimal speed for an audio chunk may be determined at least by the speech density of the received media chunk. The term "chunk" refers to the shortest portion of the media stream for which the system may assign and reproduce a different playback speed. An example media chunk may have a 50 millisecond duration.

To determine the speech density, the system may determine the acoustic unit of each received audio frame. The term "audio frame" refers to a portion of the media stream with a duration equal to a single phoneme. A non-limiting example of an audio frame is a 20-millisecond portion of the media stream that contains a single acoustic unit, such as a phoneme. Non-limiting examples of an acoustic unit are a vowel phoneme, a consonant phoneme, a silence period, and a noise period. Using a sequence of determined acoustic units in a media chunk, the system may calculate the speech density of the media chunk and, thereon, the optimal speed for playback.

At step 110, as the recipient system receives the media system captured at the originating system, the process obtains an audio frame of the media. The audio frame may contain digitally sampled representations of continuous acoustic waveforms, structured as a sequence of discrete amplitude measurements captured at regular time intervals. Another example of the content of an audio frame may be a windowed portion of audio data that has undergone frequency domain conversion through techniques such as Fast Fourier Transform or mel-frequency cepstral coefficient extraction.

In another implementation, at step 110, the recipient system may obtain a larger portion of the stream, such as a chunk or a portion, by obtaining multiple audio frames and thereby performing the next step 120 for a larger obtained portion of the media stream.

At step 120, the obtained audio frame(s) are processed to determine the acoustic unit(s) contained within the audio frame(s). The acoustic unit may contain a vowel or consonant phoneme, silence, or noise as non-limiting examples.

Machine Learning Model for Acoustic Unit Classification

In an implementation, a machine learning model is used to classify the acoustic unit in an audio frame. A non-limiting example of a machine learning model is a recurrent neural network (RNN). The recurrent neural network designed for acoustic unit classification may operate as a sequential processing system that leverages temporal dependencies inherent in the media stream. In an implementation, the RNN model receives an audio frame as input and outputs a classification for the acoustic unit of the audio frame, such as phoneme type (e.g., vowel or consonant), silence, or noise.

The RNN model employs multiple trained recurrent layers, each containing hidden states that maintain memory of previous acoustic contexts. As the RNN model processes each incoming audio frame sequentially, the recurrent connections provide information from earlier time steps to influence the classification of the current acoustic unit. Accordingly, the RNN model may distinguish between phonemes, silence periods, and noise units, as these acoustic units often exhibit different characteristic temporal patterns and contextual dependencies.

Additionally, the model's hidden layers utilize activation functions that enable the model to capture non-linear relationships between spectral features and acoustic unit categories. Each recurrent layer updates its hidden state based on both the current input features and the previous hidden state, creating a dynamic representation that evolves as the sequence progresses. In an implementation, the final layer may output probability distributions across the possible acoustic unit types through a softmax activation function, as an example.

Additionally, the model may include adaptive techniques (such as reinforcement learning) to modify parameter(s) of the model or algorithm based on a user feedback signal. In one implementation, such techniques modify only the weights that are identified as not critical for the real-time media reproduction speed determination.

As more different real-time audio streams having different characteristics of speech, silence and noise are streamed, the RNN model may adapt the parameters based on the user feedback signal. The user feedback signal may include a change in the user's desired content density index, and/or comparison with timestamped textual content as described in the Adaptive Speed Playback Patent.

In an implementation, the training process employs a categorical cross-entropy loss function, which serves as the objective function for optimizing the RNN's classification performance. This loss function calculates the difference between the predicted probability distributions and the true acoustic unit labels. The training process compares the predicted output with the known ground truth labels, where the loss increases significantly when the model assigns low probability to the correct acoustic unit class.

During each training iteration, the machine learning algorithm applies the model parameters to generate predicted outputs for input audio frames. The objective function then quantifies the accuracy of these predictions by measuring how closely the predicted probabilities align with the actual acoustic unit categories. The optimization algorithm, typically involving backpropagation through time for RNNs, adjusts the RNN model parameters to minimize this loss value across the entire training dataset.

The training methodology incorporates iterative refinement, where parameters are continuously updated based on the calculated loss gradients. The process monitors convergence by tracking the loss function output loss values across training iterations, and training terminates when the loss reduction falls below a predefined threshold or when the difference between consecutive iterations becomes substantially minimal. Using such an approach, the RNN model learns to accurately discriminate between different acoustic unit types while maintaining robust performance on previously unseen audio sequences.

The loss function design also provides for class imbalance considerations common in audio data, where silence periods or noise portions may be more frequent than specific phonemes. Through careful weighting within the cross-entropy calculation, the training process may achieve balanced classification performance across all acoustic unit categories, ensuring reliable detection of both common and rare acoustic events in real-world audio processing applications.

In an alternative implementation, the audio frame may be classified as an acoustic unit containing silence or not silence. In such an implementation, for each set of one or more audio frames, the process determines the speech probability, which is the probability that the set of audio frames contains only human speech. Alternatively or additionally, the process may determine the silence probability, which is the probability that the set of audio frames contains only silence and, thus, no speech. The process generates a probability value for whether the speech (voice) is present in the set of audio frames. The Voice Activity Detector (VAD) may be used to determine the probability values.

In yet another alternative implementation, the corresponding textual content for the set of audio frames is retrieved. The corresponding textual content may identify whether the set contains silence or speech. The corresponding textual content of the set may be any part of the textual content that is timestamped to a time duration that includes the obtained set of audio frames.

Regardless of the approach to determine acoustic unit(s) of the obtained audio frame(s), if the determination is made based on the probabilities of different acoustic units, the acoustic unit of the highest probability is selected for the corresponding audio frame.

Figure 2:
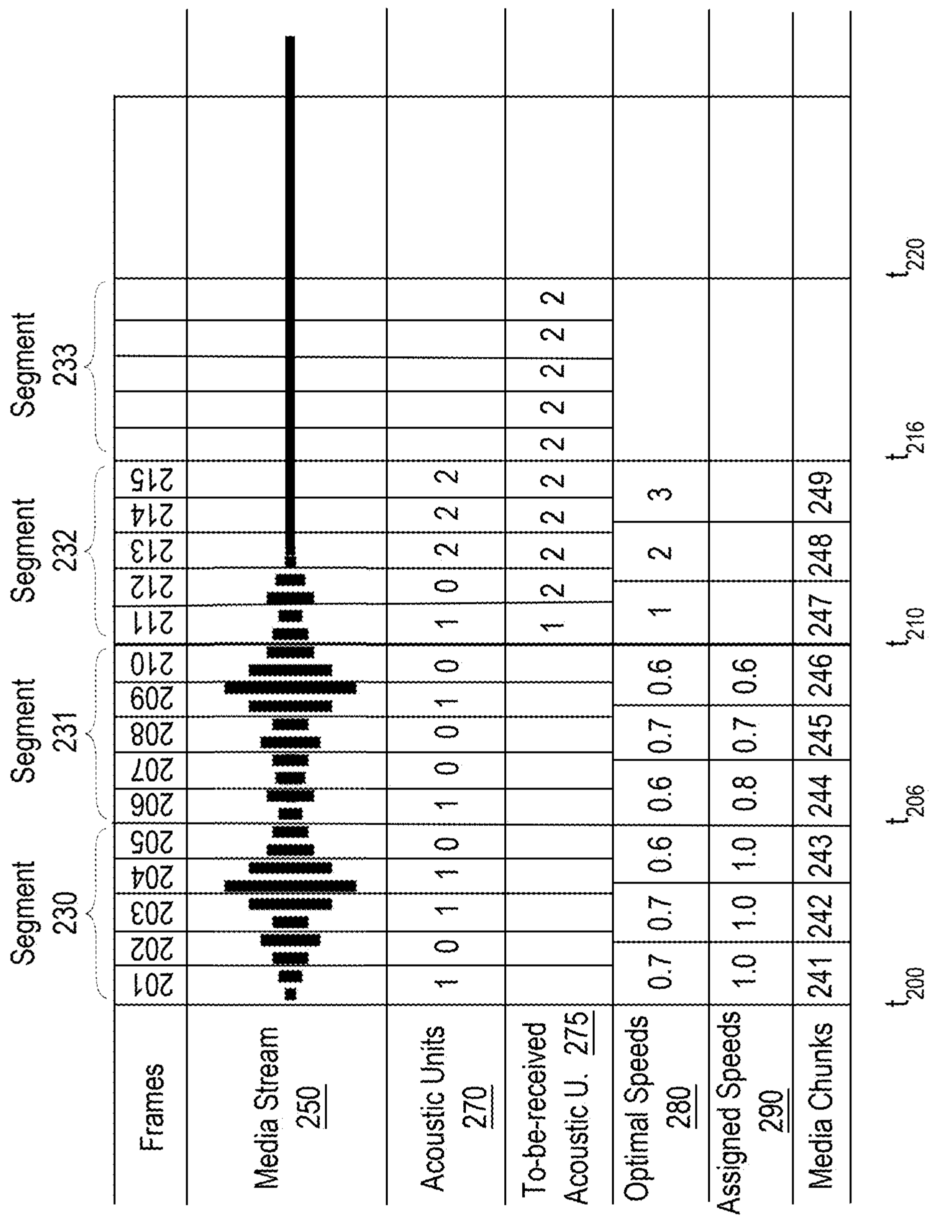
FIG. 2 is a block diagram that depicts an example media stream and the corresponding acoustic units and playback speeds that are determined for the media stream, according to one or more implementations.

FIG. 2 is a block diagram that depicts an example of received segments of a media stream and the corresponding acoustic units and playback speeds that are determined for the segments, according to one or more implementations. The term "segment" refers herein to a portion of the media stream that contains multiple audio frames. As audio frames 201-210 of media stream 250 are received, each are classified into the corresponding classifier denoting a vowel phoneme (0), a consonant phoneme (1) or a silence/noise (2), as an example. Acoustic Units 270 includes classifier value 1 for audio frame 201, denoting that audio frame 201 has been classified as a consonant phoneme. As acoustic units for audio frames of a segment of a media stream are determined, the distribution of the acoustic units may be used to determine the speech density for the audio chunks of the segment. For example, Audio Chunks 241-243 may have speech densities corresponding to the distribution and values of Acoustic Units 270 of Audio Frames 201-205 corresponding to Media Stream Segment 230.

Speech Density

In an implementation, the content density, among other parameters, may be based on the speech density. Once a segment of a media stream has been classified into acoustic units, speech density(ies) may be determined for the segment.

Figure 3:
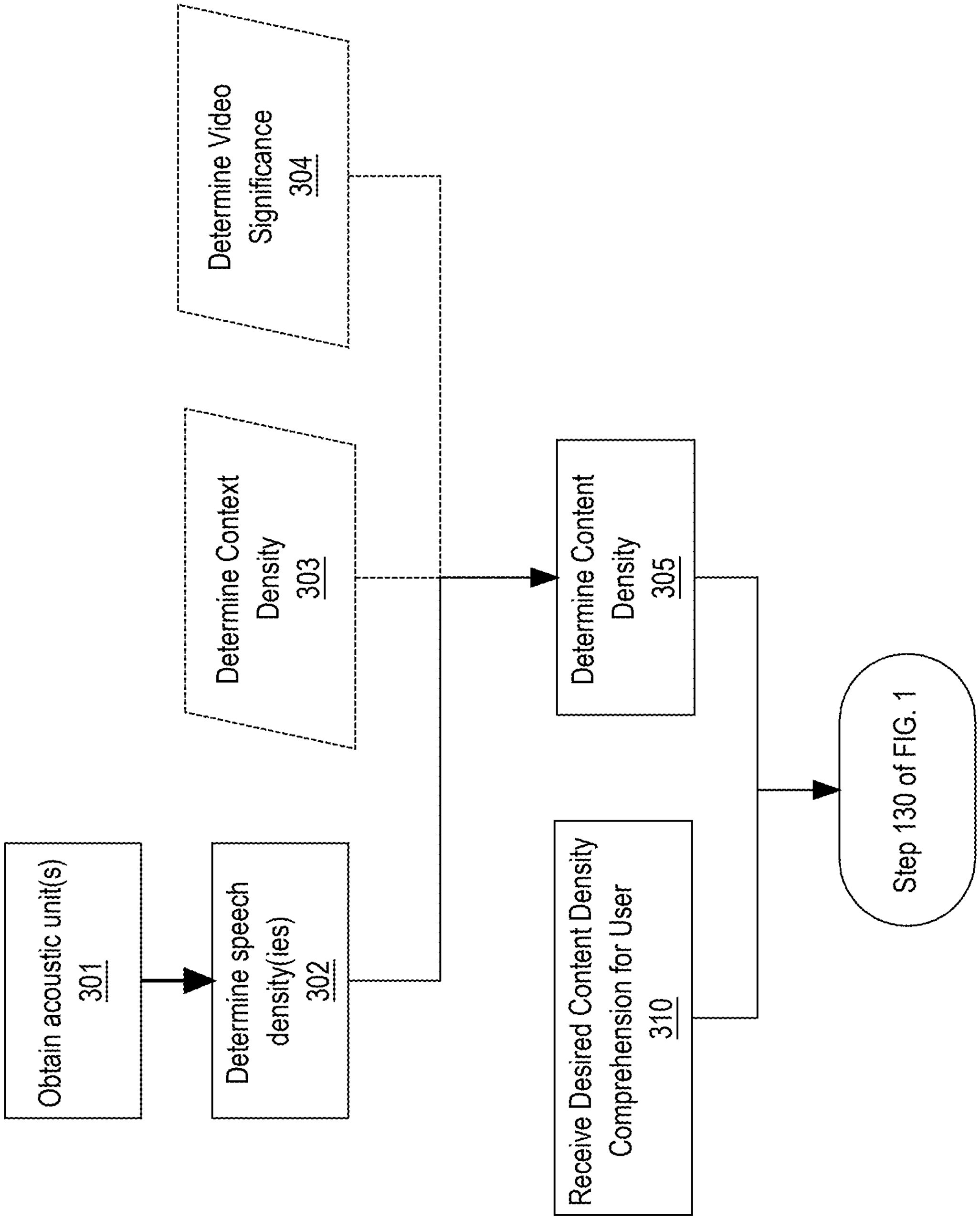
FIG. 3 is a block diagram that depicts a process for determining an optimal speed for an audio chunk, in an implementation.

FIG. 3 is a block diagram that depicts a process for determining an optimal speed for an audio chunk, in an implementation. At step 301, the process obtains the acoustic unit values determined at step 120 for the latest received segment of the media stream. Based on the distribution of acoustic unit types within the segment, the process determines the speech densities for media chunk(s) at step 302.

Continuing with the example of media 250 in FIG. 2, the process may select Segment 230 having Audio Frames 201-205 of 0.02 seconds each for calculating the speech densities for the segment. The process may determine the densities for any time period within the segment, e.g., audio frame, chunk, or the segment itself. For Audio Frame 201, Acoustic Unit 270 being a syllable (a vowel or consonant phoneme), the density may be calculated to be 1/0.02=50 syllables per second.

Other Content Density Parameters

In an implementation, other parameters apart from speech density affect the content density determination. Continuing with FIG. 3, context density may be additionally used to determine content density. The context density determination uses one or more factors to assess the content complexity relative to user comprehension capabilities. In an implementation, the system evaluates user-specific factors such as content familiarity and experience to establish baseline comprehension levels. Additionally or alternatively, the process may analyze the media stream for accent detection. Text complexity assessment may also be performed, including difficulty determination algorithms that examine vocabulary and sentence structure, topic modeling to identify latent thematic content, and text ranking algorithms using embeddings to score content importance based on definitional statements versus repetitive or off-topic material, as non-limiting examples of complexity assessments.

Using techniques described in the Adaptive Speed Playback Patent, the process may determine one or more of these factors, such as text difficulty scores, topic modeling results, importance rankings, user familiarity indices, and accent detection outputs. The factor(s) are synthesized to generate a comprehensive context density parameter value that reflects the true cognitive load required for content comprehension at step 303 of FIG. 3.

Additionally or alternatively, at step 304, the significance of the video stream may be assessed to determine whether the video stream contains any content for comprehension by the user. The process may receive video frames from the video stream that correspond to the audio segment to determine the video relevance to the comprehension by the user using the techniques described in the Adaptive Speed Playback Patent. For example, if there is silence, but the lecturer is writing something on the board, such writing may be necessary for the comprehension of the media and may have a high level of significance.

Content Density and Optimal Speed

In an implementation, one or more parameters such as the speech density, context density and video significance are used to determine the content density and thereby, the optimal playback speeds for the chunk(s) of the media stream. Continuing with FIG. 3, at step 305, the content density index value is calculated using the speech density, content density and/or video significance parameters. The content density index value for a media chunk may be calculated using the following example formula: $content_{density}=f(speech_{density}, context_{density}, video_{significance})$. For example, f may be a weighted average of any combination of the three parameters. Other formulas may include additional content density factors.

At step 310, the process obtains the desired content density comprehension parameter for a recipient user, in an implementation. The term "desired content density comprehension (parameter/index value)" refers herein to the content density value of the content of the media stream, which, when reproduced at the original speed, is fully and comfortably comprehended by the recipient user. Stated differently, the desired content density comprehension index value represents the desired rate of information for the recipient user to fully comprehend the information. The desired content density comprehension index value may be configured specifically for each user and may depend on a variety of factors of a user, such as a language barrier, the presence of cognitive disease, predisposition to a particular media type (audio/video/reading), and/or individual abilities.

Continuing with FIG. 1, at step 130, the optimal playback speed for a media chunk is calculated based on the comparison between the desired content density comprehension index of the recipient and the content density index for the media chunk.

The generated optimal playback speeds at step 130 may be stored in association with the corresponding chunk of the media. Continuing with FIG. 2, as discussed above, the system determines the acoustic unit types of received Audio Frames 201-210. At time $t_{201}$, when Audio Frame 201 is received and obtained by the system, the system determines that the acoustic unit for Audio Frame 201 is 1, indicating a consonant phoneme. At time $t_{202}$, when Audio Frame 202 is received and obtained by the system, the system determines that the acoustic unit for Audio Frame 201 is 0, indicating a vowel phoneme. Acoustic Units 270 may be determined as soon as the corresponding audio frame is received or after the receipt of a number of audio frames, such as for a segment of the media stream (e.g., Segment 230).

After enough acoustic units have been determined for a media chunk, the system may proceed to determine the speech density and other parameter values to determine the optimal playback speed for the media chunk. Accordingly, at or after time $t_{202}$, the system determines the optimal speed of 0.7 times the original speed for Optimal Speeds 280 for Media Chunk 241. Alternatively, the system may determine Optimal Speeds 280 for Audio Chunks 241-243 of Segment 230 after the receipt of Audio Frames 201-205 for same Segment 230.

Additionally, in the example of FIG. 2, Optimal Speeds 280 has a different optimal speed value determined for Media Chunk 243 (0.6×) as compared to Media Chunks 241 and 242 (0.7×), although Acoustic Units for corresponding Audio Frames 201-205 are all non-silence phonemes. The different, slower optimal speed may be determined because Media Chunk 243 may have a different value for another, such as a higher context density parameter value and/or a higher video significance parameter value. For that reason, although the speech density is the same for Media Chunks 241-243, Media Chunk 243 has a slower optimal speed value.

The system may determine that the optimal speeds are to be higher than the original speed when the content density is low. For example, for Audio Frames 214 and 215, which correspond to Media Chunk 249, the system has determined silence periods only (Acoustic Units 270 are evaluated to the value of 2, a silence period). Accordingly, the system may determine that the optimal speed is to be higher than the original speed. In this example, the system assigned 3× the original speed for silent Media Chunk 249 for Optimal Speeds 280. Additionally or alternatively, the assigned speed for low-density media chunks may depend on the future media chunk(s) content density. If the system determines that the future media chunk(s) also have low content density (e.g., noise or silence units), the system may assign an even higher optimal speed to the current low-density media chunk than if the system determined that the future media chunk has a high content density.

Thresholds for Real-Time Media Reproduction

While the optimal speeds that are higher than the original speed do not affect the real-time aspect of the media stream, slowing the playback speed for media chunk(s) to lower speeds than the original may cause disruptions and loss of the real-time aspect. For example, Optimal Speeds 280 for Media Chunks 241-243 have been determined to be slower playback speeds of 0.7, 0.7, and 0.6 times the original speed. The system may determine that slowing down Media Chunks 241-243 to Optimal Speeds 280 may compromise the real-time aspect of the reproduction of Media Stream 250 for those chunks. Accordingly, the system, using techniques described herein, assigns original playback speeds in Assigned Speeds 290 for the same Media Chunks 241-243, therefore preserving the real-time aspect of the communication.

Continuing with FIG. 1, at step 150, to determine whether there is a risk to compromise the real-time aspect of the media stream reproduction, the system calculates the projected delay for the reproduction of the media stream chunks of the current segment, in an implementation. The system uses thresholds and prediction techniques to determine whether further slowing down for increasing comprehension is possible without compromising the real-time aspect of reproduction.

Figure 4:
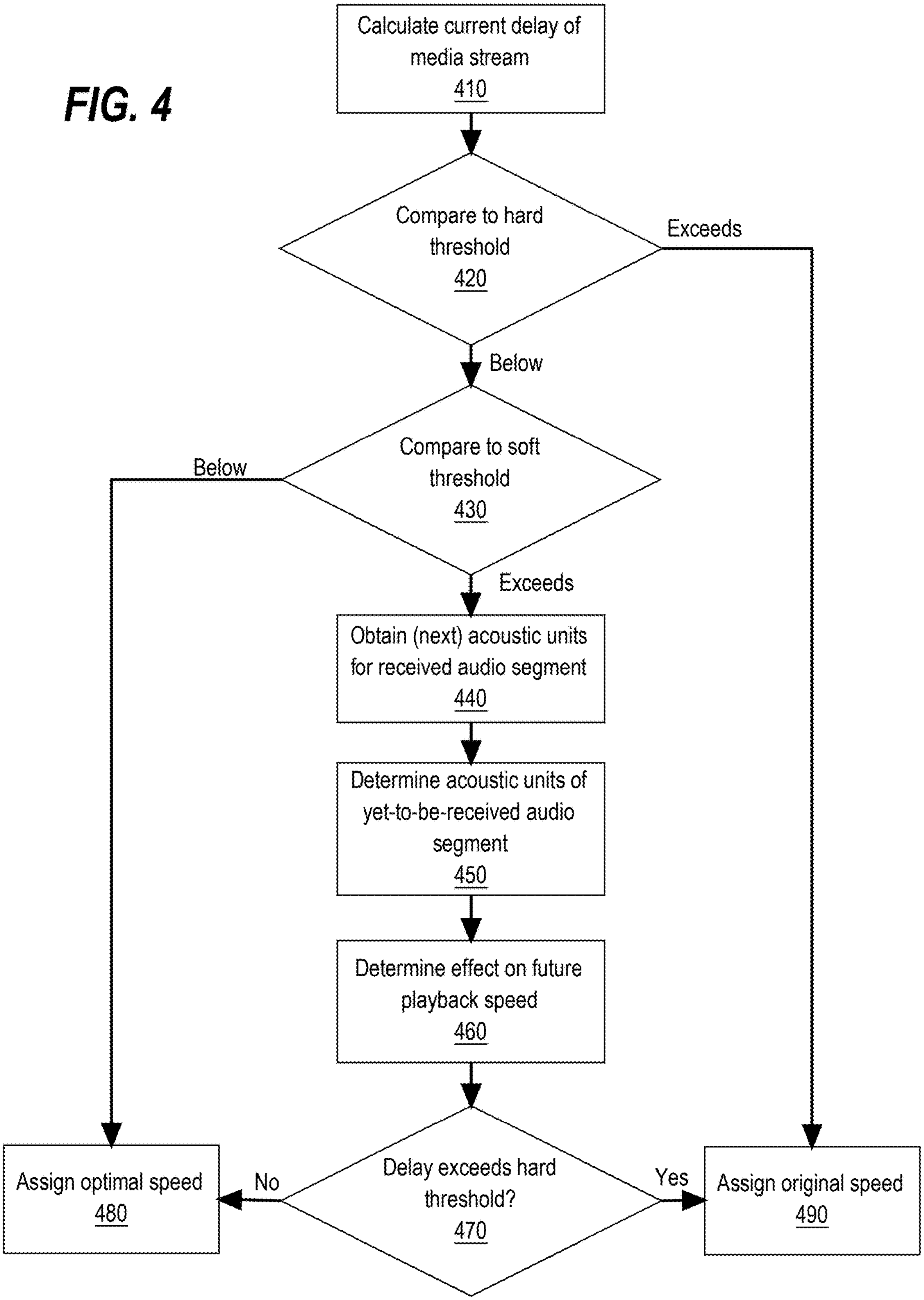
FIG. 4 is a block diagram that depicts the process for determining whether the slower optimal speed may be assigned for playback of the media stream without compromising the real-time aspect, in an implementation.

FIG. 4 is a block diagram that depicts the process for determining whether the slower optimal speed may be assigned for playback of the media stream without compromising the real-time aspect, in an implementation. At step 410, the process calculates the projected delay amount of the media stream reproduction. The projected delay amount includes the previous delay accumulated before the current segment of the media stream is received, and the delay amount added if the current segment is played back at the optimal speed. The previous delay amount may include the network latency and non-playback-related latencies.

At step 420, the process determines whether any slowdown of the playback speed is possible due to accumulated latency. If the projected latency is very close or already exceeds the real-time playback threshold, no slowdown in playback for the current segment may be possible. In an implementation, the process compares the projected delay amount to the hard threshold for latency. If, at step 420, it is determined that the projected delay amount exceeds the hard threshold for latency, then the system determines that any further slowdown in reproduction of the media stream is to cause the loss of the real-time aspect. Therefore, the process proceeds to step 490 to assign the original speed or speeds exceeding the original speed to the audio chunk(s) of the segment.

Continuing with example Media Stream 250 in FIG. 2, Optimal Speeds 280 for Segment 230 are determined to be 0.7×, 0.7×, and 0.6× for respective Media Chunks 241, 242 and 243. If each example media chunk has a duration of 50 milliseconds, then the optimal speeds would add to the delay amount 50/0.7+50/0.7+50/0.6−3*50=76 milliseconds. If the example hard latency threshold is 500 milliseconds, and the existing delay amount is 450 milliseconds, then the total projected delay amount is 526 milliseconds. The projected delay amount exceeds the hard latency threshold of 500 milliseconds. Accordingly, if Segment 230 is reproduced at the Optimal Speeds 280, Media Stream 250 may lose the real-time aspect. To avoid this and to preserve the real-time communication, in such an example, the process assigns the original speed of 1× to Segment 230, yielding Assigned Speeds 290 of Segment 230. Segment 230 is reproduced at the recipient system at the original speed.

Continuing with FIG. 4, if, on the other hand, at step 420, the process determines that the projected delay amount does not exceed the hard threshold for real-time latency, then the process proceeds to step 430.

At step 430, the process determines whether the projected delay is also below the soft threshold. If the projected delay is below the soft threshold of the real-time latency, then there is enough latency cushion for the projected delay amount to be realized without affecting the real-time aspect of the media stream reproduction. Accordingly, the process proceeds to step 480, and assigns the determined optimal speed(s) for the reproduction of the segment of the media stream.

Although the techniques describe only soft and/or hard (latency) thresholds, implementations may include other threshold(s). These thresholds may be similarly defined in relation to real-time reproduction latency threshold and used for the system to reproduce real-time media streams at more fine-tuned adaptive speeds to improve user experience.

Predicted Content Density

In an implementation, whether or not the optimal speeds may be assigned for the playback of media stream chunks may depend on whether a catch-up (higher playback speeds) would be possible in the following, not-yet-received segments. For that reason, the system may determine the predicted content density for the future, not yet received, segment(s) of the media stream.

In an implementation, the system determines the predicted content density if the projected delay amount is within the soft and hard latency threshold. At step 430, the process determines that the projected delay exceeds the soft threshold, the process determines the predicted content density. One approach to determine the predicted content density is to determine the predicted speech density by determining the acoustic units in the following, not yet received, segments of the media stream.

At step 440, the process obtains the already-classified acoustic units for the received segments to use as input to infer the acoustic units for not-yet-received segments. The process provides the acoustic units to a machine learning model as feature input to generate the predicted acoustic units of yet-to-be-received segments of the media stream.

Machine Learning Model for Predicting Acoustic Units

At step 450, the machine learning model generates the acoustic units for the yet-to-be-received segments of the media stream. In an implementation, the machine learning model operates as a sequence-to-sequence predictor that takes as input the already classified acoustic units from the received segment(s) to determine the acoustic units of the immediately following segment of the media stream.

The machine learning model may receive input representations of classified acoustic units, such as a vowel phoneme, a consonant phoneme, a silence period, and/or a noise period, from a received segment of the media stream. In such an implementation, such acoustic units are discrete categorical features that provide a structured representation of speech and non-speech elements within the received segment. The model leverages temporal dependencies and phonological patterns inherent in natural speech to predict the most likely sequence of acoustic units that is to occur in the subsequent segment, effectively learning the statistical relationships between consecutive acoustic events.

The machine learning model may include a neural network architecture that employs recurrent or transformer-based components to model the sequential nature of acoustic unit transitions, capturing both local phoneme-to-phoneme dependencies and longer-range linguistic patterns that influence speech production. In such an implementation, the model's internal representations encode contextual information about phonological environments, coarticulation effects, and prosodic structures that determine how acoustic units follow one another in natural speech.

During inference, the machine learning model processes the input acoustic unit sequence through multiple layers that progressively refine predictions, ultimately generating probability distributions over the acoustic unit types for each unit in the yet-to-be-received output segment of the media stream. This probabilistic output generates the most likely acoustic unit sequence based on learned phonological and acoustic patterns.

In an implementation, the machine learning model is generated by training a machine learning algorithm with a training dataset. The training may utilize a categorical cross-entropy loss function that measures the divergence between predicted probability distributions and ground truth acoustic unit labels in the target segments of the training dataset. The loss calculation compares the model's predicted probabilities for each acoustic unit type against ground truth vectors, penalizing predictions that assign low probability to correct acoustic units while rewarding accurate predictions. The optimization process may employ gradient descent algorithms that iteratively adjust model parameters to minimize this loss across the output of the training dataset, encouraging the model to learn robust mappings from input acoustic unit sequences to output predictions.

In an implementation, the predicted acoustic units for the yet-to-be-received segment(s) may be used to determine whether the subsequent segment(s) may be reproduced at higher than the original speed, thereby canceling the projected delay amount of the current segment. Using the techniques described above, the system may determine the predicted content density, based on the predicted acoustic units, and based on the predicted content density, determine the predicted optimal speed for the yet-to-be-received segment(s), at step 460. The predicted optimal speed(s) are then used for calculating the predicted delay amount. If, at step 470, the sum of the predicted delay amount and the projected delay amount does not exceed the hard latency threshold, then the process transitions to step 480. At step 480, the determined optimal speed(s) for the received segment are assigned to the media chunks of the segment for reproduction, thereby matching the recipient user's comprehension without compromising the real-time aspect of the media stream.

Otherwise, the total delay amount exceeds the hard threshold at step 470, the process transitions to step 490, and the original speed is assigned to the media chunks of the received segment to maintain the real-time aspect of the media stream.

In another implementation, the system may compare the predicted acoustic units to a threshold number/percentage of silence periods. If, at step 460, the predicted acoustic units in the yet-to-be-received subsequent segment(s) exceed the threshold number/percentage of silence periods, then catchup may be performed in the future, and the process transitions to step 480. At step 480, the process assigns the determined optimal speed(s) to the media chunks of the received segment, thereby matching the comprehension of the recipient user without compromising the real-time aspect of the communication.

If, at step 460, the predicted acoustic units in the yet-to-be-received segments fail to exceed the threshold number/percentage of silence periods, then the process transitions to step 490. At step 490, the original speed is assigned to the media chunks of the received segment of the media stream, thereby not increasing the reproduction latency of the segment and ensuring the real-time aspect of the communication.

Continuing with example Media Stream 250 of FIG. 2, when Segment 231's Frames 206-210 are received, the system determines Acoustic Units 270 for Frames 206-210. Using techniques described herein, the system determines Optimal Speeds 280 for corresponding Media Chunks 244-246 to be 0.6×, 0.7×, and 0.6×, respectively. Using these speeds, the system determines that the projected delay from the optimal reproduction is equal to 50/0.6+50/0.7+50/0.6−3*50=88 milliseconds.

With the delay from the previous segment reproductions being 200 milliseconds for this example, the projected delay for Segment 231 is above the soft latency threshold of 200 milliseconds but is below the hard latency threshold of 500 milliseconds. Thereby, the system uses the already determined acoustic units of Acoustic Units 270 (such as for Segment 230 and 231), as input features to determine To-be-received Acoustic Units for Segment 232 and 233. The machine learning model determines To-be-received Acoustic Units for Segment 232 and 233 to contain mostly silence periods (values of 2). For this reason, further increasing latency may be compensated by higher speed ups in the to-be-received segments of the media stream. Therefore, the optimal speeds slowing down the reproduction of the received segment to match the comprehension of the user may be used for the received segment 231 even if such reproduction would increase the latency.

In an implementation, when the system determines the speeds to be assigned to the media chunks for the reproduction, the system may apply one or more statistical functions (e.g., smoothing function) to the assigned speeds of media chunks to avoid introducing any noise in the sharp slowdown or speedup in the playback speed.

For example, between Media Chunks 243 and 244, Assigned Speeds 290 has a speed value of 1× for Media Chunk 243, which is to be slowed down for Media Chunk 244 to 0.6× of Optimal Speeds 280. The system may determine to assign an intermediary slower speed of 0.8× for Media Chunk 244 to smoother transition from the playback speed of Media Chunk 243 of 1× to Media Chunk 245 of 0.7×.

Continuing with FIG. 1, once the assigned speeds for the portion of the media stream are determined and assigned, the process transitions to step 160 to receive the next audio frame. The process repeats the steps of FIG. 1 for the next portions of the media stream to determine and assign playback speeds that maintain the real-time playback of the media while maximizing the comprehension of the recipient user. The recipient user system performs the playback of the portions according to the assigned playback speeds.

Further Details on Training Machine Learning Model

Machine learning techniques include applying a machine learning algorithm on a training data set, for which outcome(s) are known, with initialized parameters whose values are modified in each training iteration to more accurately yield the known outcome(s) (referred herein as "label(s)"). Based on such application(s), the techniques generate a machine-learning model with known parameters. Thus, a machine learning model includes a model data representation or model artifact. A model artifact comprises parameter values, which are applied by a machine learning algorithm to the input to generate a predicted output. Training a machine learning model entails determining the parameter values of the model artifact. The structure and organization of the parameter values depend on the machine learning algorithm.

Accordingly, the term "machine learning algorithm" (or simply "algorithm") refers herein to a process or set of rules to be followed in calculations in which a model artifact, comprising one or more parameters for the calculations, is unknown. The term "machine learning model" (or simply "model") refers herein to the process or set of rules to be followed in the calculations in which the model artifact, comprising one or more parameters, is known and has been derived based on the training of the respective machine learning algorithm using one or more training data sets. Once trained, the input is applied to the machine learning model to make a prediction, which may also be referred to herein as a predicted outcome or output.

In supervised training, training data is used by a supervised training algorithm to train a machine learning model. The training data includes input and "known" output, label. In an implementation, the supervised training algorithm is an iterative procedure. In each iteration, the machine learning algorithm applies the model artifact and the input to generate a predicted output. An error or variance between the predicted output and the known output is calculated using an objective function, loss function. In effect, the output of the loss function indicates the accuracy of the machine learning model based on the particular state of the model artifact in the iteration. By applying an optimization algorithm based on the loss function, the parameter values of the model artifact are adjusted. The iterations may be repeated until the desired accuracy is achieved or some other criteria are met.

In an implementation, to iteratively train an algorithm to generate a trained model, a training data set may be arranged such that each row of the data set is input to a machine learning algorithm and further stores the corresponding actual outcome, label value, for the row. For example, each row of the adult income data set represents a particular adult for whom the outcome is known, such as whether the adult has a gross income over $500,000. Each column of the adult training dataset contains numerical representations of a particular adult characteristic (e.g., whether an adult has a college degree or the age of an adult) based on which the algorithm, when trained, can accurately predict whether any adult (even one who has not been described by the training data set) has a gross income over $500,000.

The row values of a training data set may be provided as inputs to a machine learning algorithm and may be modified based on one or more parameters of the algorithm to yield a predicted outcome. The predicted outcome for a row is compared with the label value, and based on the difference, an error value is calculated. One or more error values for the batch of rows are used in a statistical aggregate function to calculate an error value for the batch. The "loss" term refers to an error value for a batch of rows.

At each training iteration, based on one or more predicted values, the corresponding loss values for the iteration are calculated. For the next training iteration, one or more parameters are modified to reduce the loss based on the current loss. Any number of iterations on a training data set may be performed to reduce the loss. The training iterations using a training data set may be stopped when the change in the losses between the iterations is within a threshold. In other words, the iterations are stopped when the loss for different iterations is substantially the same.

After the training iterations, the generated machine learning model includes the machine learning algorithm with the model artifact that yielded the smallest loss.

For example, the above-mentioned adult income data set may be iterated using the Support Vector Machines (SVM) algorithm to train an SVM-based model for the adult income data set. Each row of the adult data set is provided as an input to the SVM algorithm, and the result, the predicted outcome, of the SVM algorithm is compared to the actual outcome for the row to determine the loss. Based on the loss, the parameters of the SMV are modified. The next row is provided to the SVM algorithm with the modified parameters to yield the next row's predicted outcome. The process may be repeated until the difference in loss values of the previous iteration and the current iteration is below a predefined threshold or, in some implementations, until the difference between the smallest loss value achieved and the current iteration's loss is below a pre-defined threshold.

Once the machine learning model for the machine learning algorithm is determined, a new data set for which an outcome is unknown may be used as input to the model to calculate the predicted outcome(s) for the new data set.

In a software implementation, when a machine learning model is referred to as receiving an input, executing, and/or generating output or prediction, a computer system process executing a machine learning algorithm applies the model artifact against the input to generate predicted output. A computer system process executes a machine learning algorithm by executing software configured to cause the execution of the algorithm.

Further Details on Machine Learning Algorithms and Domains

A machine learning algorithm may be selected based on the domain of the problem and the intended type of outcome required by the problem. The non-limiting examples of algorithm outcome types may be discrete values for problems in the classification domain, continuous values for problems in the regression domain, or anomaly detection problems in the clustering domain.

However, even for a particular domain, there are many algorithms to choose from for selecting the most accurate algorithm to solve a given problem. As non-limiting examples, in a classification domain, Support Vector Machines (SVM), Random Forests (RF), Decision Trees (DT), Bayesian networks (BN), stochastic algorithms such as genetic algorithms (GA), or connectionist topologies such as artificial neural networks (ANN) may be used.

Implementations of machine learning may rely on matrices, symbolic models, and hierarchical and/or associative data structures. Parameterized (i.e., configurable) implementations of best-of-breed machine learning algorithms may be found in open-source libraries such as Google's TensorFlow for Python and C++ or Georgia Institute of Technology's MLPack for C++. Shogun is an open-source C++ ML library with adapters for several programming languages, including C #, Ruby, Lua, Java, MatLab, R, and Python.

Hyper-Parameters, Cross-Validation and Algorithm Selection

A type of machine algorithm may have unlimited variants based on one or more hyper-parameters. The term "hyper-parameter" refers to a parameter in a model artifact that is set before the training of the machine algorithm model and is not modified during the training of the model. In other words, a hyper-parameter is a constant value that affects (or controls) the generated trained model independent of the training data set. A machine learning model with a model artifact that has only hyper-parameter values set is referred to herein as a "variant of a machine learning algorithm" or simply "variant." Accordingly, different hyperparameter values for the same type of machine learning algorithm may yield significantly different loss values on the same training data set during the training of a model.

For example, the SVM machine learning algorithm includes two hyperparameters: "C" and "gamma." The "C" hyper-parameter may be set to any value from $10^{-3}$ to $10^{5}$, while the "gamma" hyper-parameter may be set from $10^{-5}$ to $10^{3}$. Accordingly, there are endless permutations of the "C" and "gamma" parameters that may yield different loss values for training the same adult income training data set.

Therefore, to select a type of algorithm or, moreover, to select the best-performing variant of an algorithm, various hyper-parameter selection techniques are used to generate distinct sets of hyper-parameter values. Non-limiting examples of hyper-parameter value selection techniques include a Bayesian optimization such as a Gaussian process for hyper-parameter value selection, a random search, a gradient-based search, a grid search, hand-tuning techniques, a tree-structured Parzen Estimators (TPE) based technique.

With distinct sets of hyper-parameters values selected based on one or more of these techniques, each machine learning algorithm variant is trained on a training data set. A test data set is used as an input to the trained model for calculating the predicted result values. The predicted result values are compared with the corresponding label values to determine the performance score. The performance score may be computed based on calculating the error rate of predicted results in relation to the corresponding labels. For example, in a categorical domain, if out of 10,000 inputs to the model, only 9,000 matched the labels for the inputs, then the performance score is computed to be 90%. In non-categorical domains, the performance score may be further based on a statistical aggregation of the difference between the label value and the predicted result value.

The term "trial" refers herein to the training of a machine learning algorithm using a distinct set of hyper-parameter values and testing the machine learning algorithm using at least one test data set. In an implementation, cross-validation techniques, such as k-fold cross-validation, are used to create many pairs of training and test datasets from an original training data set. Each pair of data sets together contains the original training data set, but the pairs partition the original data set in different ways between a training data set and a test data set. For each pair of data sets, the training data set is used to train a model based on the selected set of hyperparameters, and the corresponding test data set is used for calculating the predicted result values with the trained model. Based on inputting the test data set to the trained machine learning model, the performance score for the pair (or fold) is calculated. If there is more than one pair (i.e., fold), then the performance scores are statistically aggregated (e.g., average, mean, min, max) to yield a final performance score for the variant of the machine learning algorithm.

Each trial is computationally very expensive, as it includes multiple training iterations for a variant of the machine algorithm to generate the performance score for one distinct set of hyper-parameter values of the machine learning algorithm. Accordingly, reducing the number of trials can dramatically reduce the necessary computational resources (e.g., processor time and cycles) for tuning.

Furthermore, since the performance scores are generated to select the most accurate algorithm variant, the more precise the performing score itself is, the more precise the generated model's prediction relative accuracy is compared to other variants. Indeed, once the machine learning algorithm and its hyper-parameter value-based variant are selected, a machine model is trained by applying the algorithm variant to the full training data set using the techniques discussed above. This generated machine-learning model is expected to predict the outcome with more accuracy than the machine-learning models of any other variant of the algorithm.

The precision of the performance score itself depends on how much computational resources are spent on tuning hyper-parameters for an algorithm. Computational resources can be wasted on testing sets of hyper-parameter values that cannot yield the desired accuracy of the eventual model.

Similarly, less (or no) computational resources may be spent on tuning those hyper-parameters for a type of algorithm that is most likely to be less accurate than another type of algorithm. Accordingly, the number of trials may be reduced or eliminated for hyper-parameters of discounted algorithms, thus substantially increasing the performance of the computer system.

Software Overview

Figure 5:
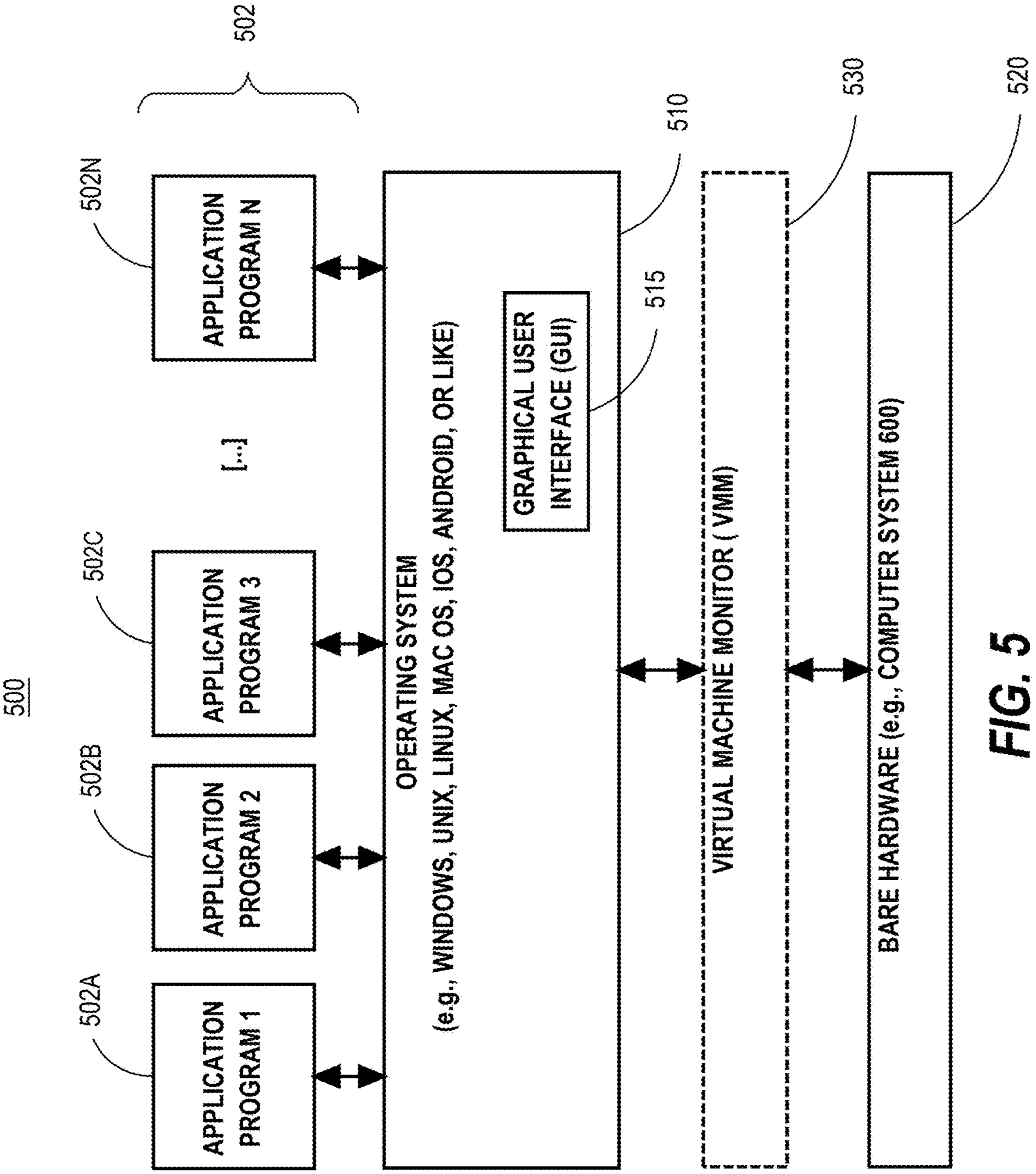
FIG. 5 is a block diagram of a basic software system, in one or more embodiments.
Figure 6:
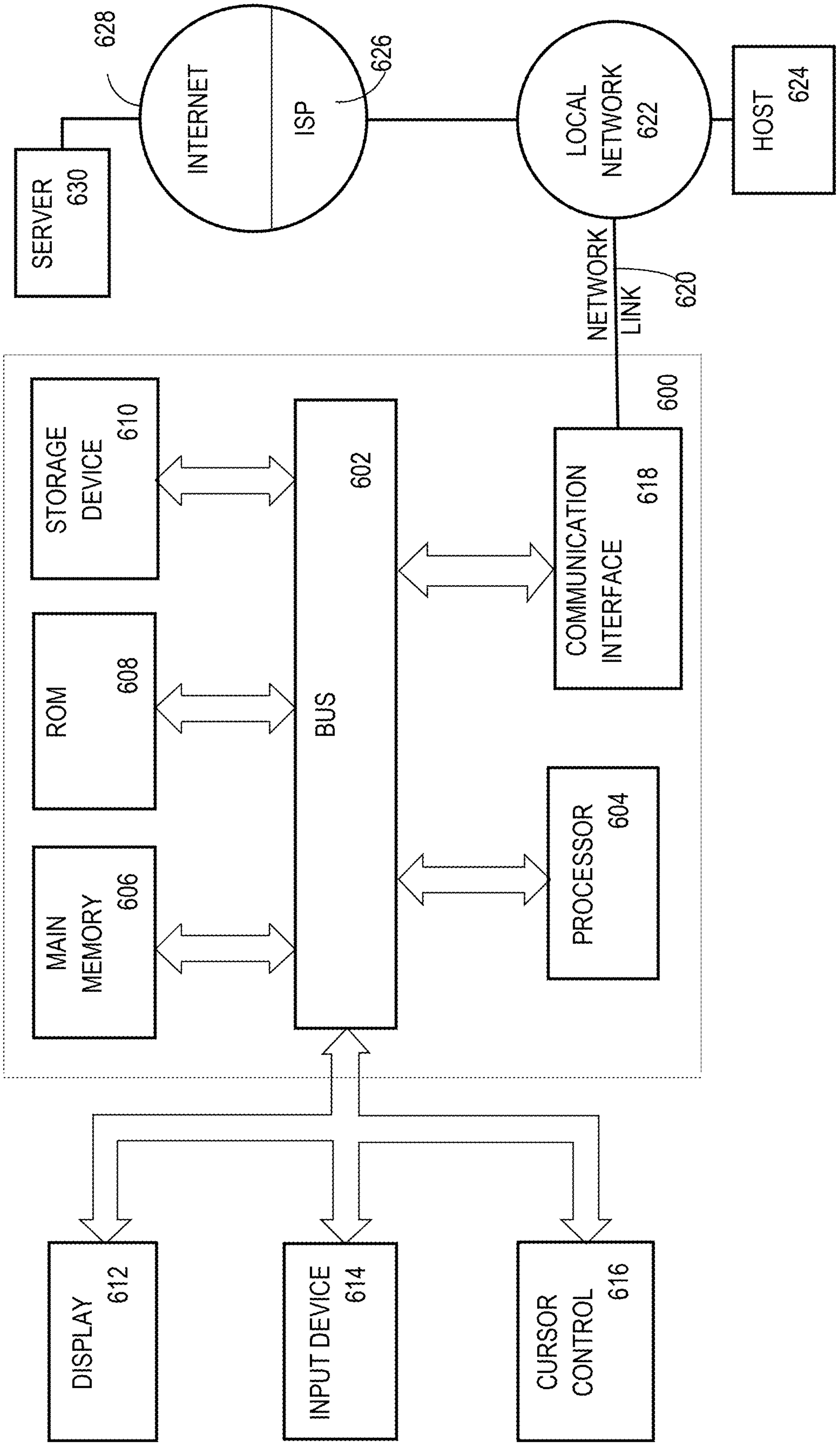
FIG. 6 is a block diagram that illustrates a computer system upon which an embodiment of the invention may be implemented.

FIG. 5 is a block diagram of a basic software system 500 that may be employed for controlling the operation of computing system 600 of FIG. 6. Software system 500 and its components, including their connections, relationships, and functions, are meant to be exemplary only, and not meant to limit implementations of the example embodiment(s). Other software systems suitable for implementing the example embodiment(s) may have different components, including components with different connections, relationships, and functions.

Software system 500 is provided for directing the operation of computing system 600. Software system 500, which may be stored in system memory (RAM) 606 and on fixed storage (e.g., hard disk or flash memory) 610, includes a kernel or operating system (OS) 510.

The OS 510 manages low-level aspects of computer operation, including managing execution of processes, memory allocation, file input and output (I/O), and device I/O. One or more application programs represented as 502A, 502B, 502C . . . 502N, may be "loaded" (e.g., transferred from fixed storage 610 into memory 606) for execution by the system 500. The applications or other software intended for use on computer system 600 may also be stored as a set of downloadable computer-executable instructions, for example, for downloading and installation from an Internet location (e.g., a Web server, an app store, or another online service).

Software system 500 includes a graphical user interface (GUI) 515, for receiving user commands and data in a graphical (e.g., "point-and-click" or "touch gesture") fashion. These inputs, in turn, may be acted upon by the system 500 in accordance with instructions from operating system 510 and/or application(s) 502. The GUI 515 also serves to display the results of operation from the OS 510 and application(s) 502, whereupon the user may supply additional inputs or terminate the session (e.g., log off).

OS 510 can execute directly on the bare hardware 520 (e.g., processor(s) 604) of computer system 600. Alternatively, a hypervisor or virtual machine monitor (VMM) 530 may be interposed between the bare hardware 520 and the OS 510. In this configuration, VMM 530 acts as a software "cushion" or virtualization layer between the OS 510 and the bare hardware 520 of the computer system 600.

VMM 530 instantiates and runs one or more virtual machine instances ("guest machines"). Each guest machine comprises a "guest" operating system, such as OS 510, and one or more applications, such as application(s) 502, designed to execute on the guest operating system. The VMM 530 presents the guest operating systems with a virtual operating platform and manages the execution of the guest operating systems.

In some instances, the VMM 530 may allow a guest operating system to run as if it is running on the bare hardware 520 of computer system 600 directly. In these instances, the same version of the guest operating system configured to execute on the bare hardware 520 directly may also execute on VMM 530 without modification or reconfiguration. In other words, VMM 530 may provide full hardware and CPU virtualization to a guest operating system in some instances.

In other instances, a guest operating system may be specially designed or configured to execute on VMM 530 for efficiency. In these instances, the guest operating system is "aware" that it executes on a virtual machine monitor. In other words, VMM 530 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system and may run under the control of other programs being executed on the computer system.

Multiple threads may run within a process. Each thread also comprises an allotment of hardware processing time but share access to the memory allotted to the process. The memory is used to store the content of processors between the allotments when the thread is not running. The term thread may also be used to refer to a computer system process in multiple threads that are not running.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field-programmable gate arrays (FPGAs) that are persistently programmed to perform the techniques, or may include one or more general-purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general-purpose microprocessor.

Computer system 600 also includes a main memory 606, such as a random access memory (RAM) or another dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read-only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire, and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid-state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal, and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic, or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626, in turn, provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610 or other non-volatile storage for later execution.

The above-described basic computer hardware and software and cloud computing environment presented for the purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:

while receiving a media stream for playback at an original playback speed in real-time:

obtaining one or more audio frames of a received media chunk of the media stream;

based, at least in part, on the one or more audio frames, determining one or more acoustic units for the received media chunk of the media stream;

based, at least in part, on the one or more acoustic units of the received media chunk, determining one or more optimal playback speeds for the received media chunk that are different than the original playback speed;

determining one or more optimal playback speeds for a received media segment;

based, at least in part, on the one or more optimal playback speeds for the received media segment, determining a delay time amount that is to be accumulated when the received media segment is played back according to the one or more optimal playback speeds for the received media segment as compared to the original playback speed;

determining that the delay time amount exceeds a latency threshold for the received media segment;

based, at least in part, on a) determining that the delay time amount exceeds the latency threshold for the received media segment, and b) determining a predicted content density for a to-be-received media segment, determining whether to assign one or more new playback speeds or the original playback speed to the received media segment to maintain real-time playback of the media stream;

wherein the to-be-received media segment is different from and temporally after the received media chunk in the media stream.

2. The method of claim 1, further comprising:

based, at least in part, on the one or more acoustic units, determining one or more speech densities of the received media chunk;

based, at least in part, on the one or more speech densities of the received media chunk, determining the one or more optimal playback speeds for the received media chunk.

3. The method of claim 2, further comprising:

obtaining a comprehension index for a user receiving the media stream for playback;

based, at least in part, on the one or more speech densities of the received media chunk and the comprehension index of the user, determining the one or more optimal playback speeds for the received media segment.

4. The method of claim 1, further comprising:

performing one or more statistical functions on an initial plurality of playback speeds to determine the one or more new playback speeds.

5. A computer-implemented method comprising:

while receiving a media stream for playback at an original playback speed in real-time:

determining one or more optimal playback speeds for a received media segment;

based, at least in part, on the one or more optimal playback speeds for the received media segment, determining a delay time amount that is to be accumulated when the received media segment is played back according to the one or more optimal playback speeds for the received media segment as compared to the original playback speed;

determining that the delay time amount exceeds a latency threshold for the received media segment;

based, at least in part, on a) determining that the delay time amount exceeds the latency threshold for the received media segment, and b) determining a predicted content density for a to-be-received media segment, determining whether to assign one or more new playback speeds or the original playback speed to the received media segment to maintain real-time playback of the media stream;

wherein the to-be-received media segment is different from and temporally after the received media segment in the media stream;

wherein the delay time amount is below a maximum delay threshold that indicates a maximum delay time amount such that playback of the received media segment fails to cause the to-be-received media segment to exceed the latency threshold.

6. The method of claim 5, wherein the delay time amount is above the maximum delay threshold, the method further comprising:

assigning a particular speed, which is greater than or equal to the original playback speed, to the received media segment, and thereby, performing the playback of the to-be-received media segment at least according to the original playback speed.

7. The method of claim 6, wherein the delay time amount exceeds the maximum delay threshold, the method further comprising:

assigning a particular speed, which is greater than or equal to the original playback speed, to the received media segment, and thereby, performing the playback of the to-be-received media segment at least according to the original playback speed.

8. A computer-implemented method comprising:

while receiving a media stream for playback at an original playback speed in real-time:

obtaining one or more audio frames of a received media chunk of the media stream;

based, at least in part, on the one or more audio frames, determining one or more current acoustic units for the received media chunk of the media stream;

based, at least in part, on the one or more current acoustic units of the received media chunk, determining one or more future acoustic units of a to-be-received media segment;

based, at least in part, on the one or more future acoustic units of the to-be-received media segment, determining a predicted content density for the to-be-received media segment;

determining one or more optimal playback speeds for a received media segment;

based, at least in part, on the one or more optimal playback speeds for the received media segment, determining a delay time amount that is to be accumulated when the received media segment is played back according to the one or more optimal playback speeds for the received media segment as compared to the original playback speed;

determining that the delay time amount exceeds a latency threshold for the received media segment;

based, at least in part, on a) determining that the delay time amount exceeds the latency threshold for the received media segment, and b) determining the predicted content density for the to-be-received media segment, determining whether to assign one or more new playback speeds or the original playback speed to the received media segment to maintain real-time playback of the media stream;

wherein the to-be-received media segment is different from and temporally after the received media chunk in the media stream.

9. A system comprising one or more processors and one or more storage media storing one or more computer programs that include instructions, which, when executed by the one or more processors, cause:

while receiving a media stream for playback at an original playback speed in real-time:

obtaining one or more audio frames of a received media chunk of the media stream;

based, at least in part, on the one or more audio frames, determining one or more acoustic units for the received media chunk of the media stream;

based, at least in part, on the one or more acoustic units of the received media chunk, determining one or more optimal playback speeds for the received media chunk that are different than the original playback speed;

determining one or more optimal playback speeds for a received media segment;

based, at least in part, on the one or more optimal playback speeds for the received media segment, determining a delay time amount that is to be accumulated when the received media segment is played back according to the one or more optimal playback speeds for the received media segment as compared to the original playback speed;

determining that the delay time amount exceeds a latency threshold for the received media segment;

based, at least in part, on a) determining that the delay time amount exceeds the latency threshold for the received media segment, and b) determining a predicted content density for a to-be-received media segment, determining whether to assign one or more new playback speeds or the original playback speed to the received media segment to maintain real-time playback of the media stream;

wherein the to-be-received media segment is different from and temporally after the received media chunk in the media stream.

10. The system of claim 9, wherein the one or more programs include instructions, which, when executed by the one or more processors, further cause:

based, at least in part, on the one or more acoustic units, determining one or more speech densities of the received media chunk;

based, at least in part, on the one or more speech densities of the received media chunk, determining the one or more optimal playback speeds for the received media chunk.

11. The system of claim 10, wherein the one or more programs include instructions, which, when executed by the one or more processors, further cause:

obtaining a comprehension index for a user receiving the media stream for playback;

based, at least in part, on the one or more speech densities of the received media chunk and the comprehension index of the user, determining the one or more optimal playback speeds for the received media segment.

12. The system of claim 9, wherein the one or more programs include instructions, which, when executed by the one or more processors, further cause:

performing one or more statistical functions on an initial plurality of playback speeds to determine the one or more new playback speeds.

13. A system comprising one or more processors and one or more storage media storing one or more computer programs that include instructions, which, when executed by the one or more processors, cause:

while receiving a media stream for playback at an original playback speed in real-time:

determining one or more optimal playback speeds for a received media segment;

based, at least in part, on the one or more optimal playback speeds for the received media segment, determining a delay time amount that is to be accumulated when the received media segment is played back according to the one or more optimal playback speeds for the received media segment as compared to the original playback speed;

determining that the delay time amount exceeds a latency threshold for the received media segment;

based, at least in part, on a) determining that the delay time amount exceeds the latency threshold for the received media segment, and b) determining a predicted content density for a to-be-received media segment, determining whether to assign one or more new playback speeds or the original playback speed to the received media segment to maintain real-time playback of the media stream;

wherein the to-be-received media segment is different from and temporally after the received media segment in the media stream;

wherein the delay time amount is below a maximum delay threshold that indicates a maximum delay time amount such that playback of the received media segment fails to cause the to-be-received media segment to exceed the latency threshold.

14. The system of claim 13, wherein the delay time amount is above the maximum delay threshold, and wherein the one or more programs include instructions, which, when executed by the one or more processors, further cause:

assigning a particular speed, which is greater than or equal to the original playback speed, to the received media segment, and thereby, performing the playback of the to-be-received media segment at least according to the original playback speed.

15. The system of claim 13, wherein the delay time amount exceeds the maximum delay threshold, and wherein the one or more programs include instructions, which, when executed by the one or more processors, further cause:

assigning a particular speed, which is greater than or equal to the original playback speed, to the received media segment, and thereby, performing the playback of the to-be-received media segment at least according to the original playback speed.

16. A system comprising one or more processors and one or more storage media storing one or more computer programs that include instructions, which, when executed by the one or more processors, cause:

while receiving a media stream for playback at an original playback speed in real-time:

obtaining one or more audio frames of a received media chunk of the media stream;

based, at least in part, on the one or more audio frames, determining one or more current acoustic units for the received media chunk of the media stream;

based, at least in part, on the one or more current acoustic units of the received media chunk, determining one or more future acoustic units of a to-be-received media segment;

based, at least in part, on the one or more future acoustic units of the to-be-received media segment, determining a predicted content density for the to-be-received media segment;

determining one or more optimal playback speeds for a received media segment;

based, at least in part, on the one or more optimal playback speeds for the received media segment, determining a delay time amount that is to be accumulated when the received media segment is played back according to the one or more optimal playback speeds for the received media segment as compared to the original playback speed;

determining that the delay time amount exceeds a latency threshold for the received media segment;

based, at least in part, on a) determining that the delay time amount exceeds the latency threshold for the received media segment, and b) determining the predicted content density for the to-be-received media segment, determining whether to assign one or more new playback speeds or the original playback speed to the received media segment to maintain real-time playback of the media stream;

wherein the to-be-received media segment is different from and temporally after the received media chunk in the media stream.

17. One or more non-transitory computer-readable media storing a set of instructions, wherein the set of instructions includes instructions, which when executed by one or more hardware processors, cause:

while receiving a media stream for playback at an original playback speed in real-time:

obtaining one or more audio frames of a received media chunk of the media stream;

based, at least in part, on the one or more audio frames, determining one or more acoustic units for the received media chunk of the media stream;

based, at least in part, on the one or more acoustic units of the received media chunk, determining one or more optimal playback speeds for the received media chunk that are different than the original playback speed;

determining one or more optimal playback speeds for a received media segment;

based, at least in part, on the one or more optimal playback speeds for the received media segment, determining a delay time amount that is to be accumulated when the received media segment is played back according to the one or more optimal playback speeds for the received media segment as compared to the original playback speed;

determining that the delay time amount exceeds a latency threshold for the received media segment;

based, at least in part, on a) determining that the delay time amount exceeds the latency threshold for the received media segment, and b) determining a predicted content density for a to-be-received media segment, determining whether to assign one or more new playback speeds or the original playback speed to the received media segment to maintain real-time playback of the media stream;

wherein the to-be-received media segment is different from and temporally after the received media chunk in the media stream.

18. The one or more non-transitory computer-readable media of claim 17, wherein the set of instructions further includes instructions, which when executed by said one or more hardware processors, cause:

based, at least in part, on the one or more acoustic units, determining one or more speech densities of the received media chunk;

based, at least in part, on the one or more speech densities of the received media chunk, determining the one or more optimal playback speeds for the received media chunk.

19. The one or more non-transitory computer-readable media of claim 18, wherein the set of instructions further includes instructions, which when executed by said one or more hardware processors, cause:

obtaining a comprehension index for a user receiving the media stream for playback;

based, at least in part, on the one or more speech densities of the received media chunk and the comprehension index of the user, determining the one or more optimal playback speeds for the received media segment.

20. The one or more non-transitory computer-readable media of claim 17, wherein the set of instructions further includes instructions, which when executed by said one or more hardware processors, cause:

performing one or more statistical functions on an initial plurality of playback speeds to determine the one or more new playback speeds.

21. One or more non-transitory computer-readable media storing a set of instructions, wherein the set of instructions includes instructions, which when executed by one or more hardware processors, cause:

while receiving a media stream for playback at an original playback speed in real-time:

determining one or more optimal playback speeds for a received media segment;

based, at least in part, on the one or more optimal playback speeds for the received media segment, determining a delay time amount that is to be accumulated when the received media segment is played back according to the one or more optimal playback speeds for the received media segment as compared to the original playback speed;

determining that the delay time amount exceeds a latency threshold for the received media segment;

based, at least in part, on a) determining that the delay time amount exceeds the latency threshold for the received media segment, and b) determining a predicted content density for to-be-received media segment, determining whether to assign one or more new playback speeds or the original playback speed to the received media segment to maintain real-time playback of the media stream;

wherein the to-be-received media segment is different from and temporally after the received media segment in the media stream;

wherein the delay time amount is below a maximum delay threshold that indicates a maximum delay time amount such that playback of the received media segment fails to cause the to-be-received media segment to exceed the latency threshold.

22. The one or more non-transitory computer-readable media of claim 21, wherein the set of instructions further includes instructions, which when executed by said one or more hardware processors, cause:

assigning a particular speed, which is greater than or equal to the original playback speed, to the received media segment, and thereby, performing the playback of the to-be-received media segment at least according to the original playback speed.

23. The one or more non-transitory computer-readable media of claim 21, wherein the set of instructions further includes instructions, which when executed by said one or more hardware processors, cause:

assigning a particular speed, which is greater than or equal to the original playback speed, to the received media segment, and thereby, performing the playback of the to-be-received media segment at least according to the original playback speed.

24. One or more non-transitory computer-readable media storing a set of instructions, wherein the set of instructions includes instructions, which when executed by one or more hardware processors, cause:

while receiving a media stream for playback at an original playback speed in real-time:

obtaining one or more audio frames of a received media chunk of the media stream;

based, at least in part, on the one or more audio frames, determining one or more current acoustic units for the received media chunk of the media stream;

based, at least in part, on the one or more current acoustic units of the received media chunk, determining one or more future acoustic units of a to-be-received media segment;

based, at least in part, on the one or more future acoustic units of the to-be-received media segment, determining a predicted content density for the to-be-received media segment;

determining one or more optimal playback speeds for a received media segment;

based, at least in part, on the one or more optimal playback speeds for the received media segment, determining a delay time amount that is to be accumulated when the received media segment is played back according to the one or more optimal playback speeds for the received media segment as compared to the original playback speed;

determining that the delay time amount exceeds a latency threshold for the received media segment;

based, at least in part, on a) determining that the delay time amount exceeds the latency threshold for the received media segment, and b) determining the predicted content density for the to-be-received media segment, determining whether to assign one or more new playback speeds or the original playback speed to the received media segment to maintain real-time playback of the media stream;

wherein the to-be-received media segment is different from and temporally after the received media chunk in the media stream.

* * * * *